Figures 1, 2:
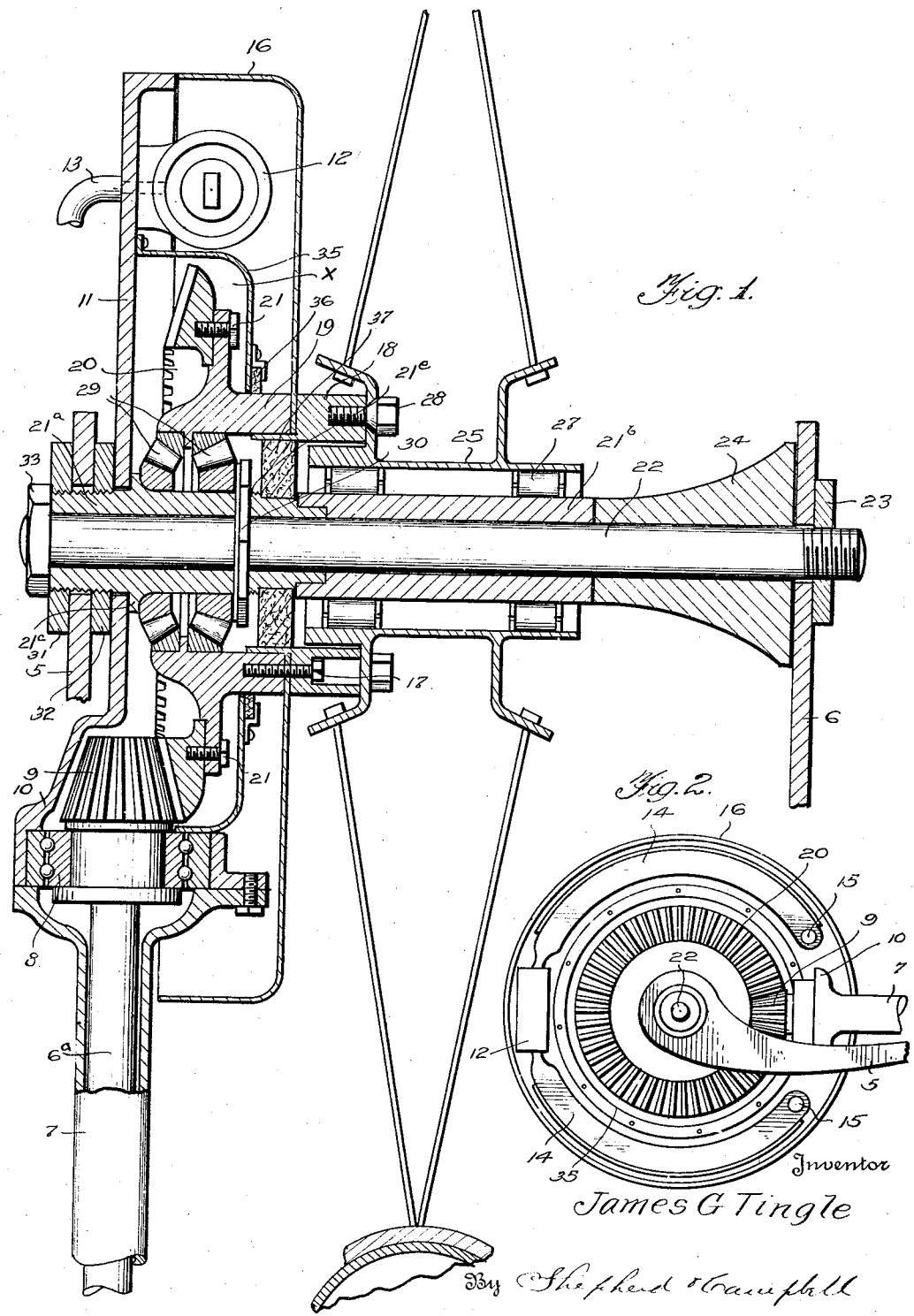

May 2, 1939.  J. G. TINGLE  2,156,412

DRIVE MECHANISM FOR TANDEM WHEEL VEHICLES

Filed June 29, 1938

Inventor
James G Tingle
By Shepherd & Campbell
Attorneys

Patented May 2, 1939

2,156,412

UNITED STATES PATENT OFFICE 2,156,412

DRIVE MECHANISM FOR TANDEM WHEEL VEHICLES

James G. Tingle, Miami, Fla.

Application June 29, 1938, Serial No. 216,571

6 Claims. (Cl. 180—30)

This invention relates to driving mechanisms for two wheeled vehicles of the character of those disclosed in my co-pending applications, Serial No. 98,947, filed September 1, 1936, and Serial No. 190,503, filed February 14, 1938.

It is a primary object of the present invention to get rid of the chain drives so commonly employed upon vehicles of this character, said chain drives being dirty, noisy, and unsafe. I aim to provide by the construction herein shown and described, a combination of gear and pinion drive, brake assembly and wheel mounting of such a nature that it will be easy to assemble, will be light, strong and rigid in construction, and will permit the removal of the rear driving wheel when necessary, with minimum trouble and loss of time. Further objects and advantages of the invention will be set forth in the detailed description which follows:

In the accompanying drawing:

Figure 1 is a horizontal sectional view through the mechanism of the present invention and Figure 2 is a side elevation looking toward the right in Figure 1, with parts removed to expose the interior of the gear case.

Like numerals designate corresponding parts in both of the figures of the drawing. In the drawing, the numerals 5 and 6 designate the side frame members of the vehicle. A horizontally extending drive shaft $6^a$ extends through the drive shaft housing 7 and is supported upon antifriction bearings 8. The drive shaft carries a drive pinion 9 that is housed within a cap 10 of the drive shaft housing. This cap is extended to have formed therewith a fixed disc 11 which carries a brake cylinder 12. Any suitable pressure fluid may be supplied to this cylinder through a tube indicated at 13. When pressure fluid is admitted to the cylinder 12, it acts against opposed pistons, in said cylinder, to thrust brake shoes 14 outwardly upon the pivots 15, to cause said brake shoes to engage the inner periphery of a brake drum 16. This brake drum is secured by bolts 17 to a ring 18 and to the body portion 19 of a ring gear, the teeth of said ring gear, being indicated at 20 and being secured to the body portion 19 by cap screws 21. The teeth 20 of the ring gear, mesh with the teeth of pinion 9, as will be readily understood.

A two-part tubular shaft consisting of the sections $21^a$ and $21^b$ are mounted upon a solid shaft 22. The end of this shaft, in Figure 1, passes through the frame 6 and has a nut 23 threaded thereon. A nipple 24 lies between the frame member 6 and the end of the tubular shaft $21^b$ and acts as a supporting, strengthening and filling piece. The hub of the wheel to be driven is indicated at 25 and carries the spokes of the wheel in a conventional way. This hub is supported upon the exterior of the tubular shaft section $21^b$ through interposed roller bearings 27. This wheel hub is secured by cap screws 28 to the ring 18 and thus is caused to turn with the brake drum and the ring gear body 19. The ring gear, in turn, is supported by the tapered roller bearings 29 upon the tubular shaft section $21^a$. This shaft section carries a collar $21^c$ and is threaded at $21^e$ for the reception of a nut 30 by which the bearings 29 may be adjusted.

A threaded extension of the tubular shaft $21^a$ receives nuts 31 and 32. The nut 32 binds the fixed disc 11 between said nut and the collar $21^c$, and the nut 31 binds the tubular shaft section firmly to the frame 5.

A nut 33 or other suitable head is provided upon the solid shaft 22. The nut 32 holds the tubular shaft section $21^a$ firmly in place in the disc 11 and thereby holds the tapered bearings, ring gear and brake drum firmly in place. The grease housing 35 is secured directly to the disc 11. The nut 31 holds the frame 5 tightly against the nut 32 and thereby binds the entire gear assembly firmly in the frame.

When the shaft 22 is inserted through the tubular shaft sections $21^a$ and $21^b$ and also through the nipple 24 and the frame 6 and the nut 23 is tightened, the tubular shaft sections $21^a$ and $21^b$ and nipple 24 become as one tubular shaft held between the frame members 5 and 6, it being noted that section $21^a$ has a reduced end portion which enters a corresponding recess in the confronting end of section $21^b$. When it is desired to remove the wheel 25 the nut 23 is removed and the shaft 22 is withdrawn from nipple 24 and shaft section $21^b$. The nipple 24 will then drop out. By removing the cap screws 28 the wheel will come out leaving the shaft section $21^b$ and bearings 27 intact within the hub of the wheel ready to be replaced with the wheel after any repairs to the latter or its tire have been made. The gear case 10, disc 11, brake drum and associated parts will remain intact in their relation to the frame member 5. The housing 35 provides a grease compartment X for the reception of lubricant for the ring gear and pinion, and felt grease retainers are disposed at 36 and 37 to prevent the escape of grease. From the foregoing description, it will be seen that a very compact mechanism has been provided.

It is to be understood that the invention is not limited to the precise construction set forth but that it includes within its purview whatever changes fairly come within either the terms or the spirit of the appended claims.

Having described my invention, what I claim is:

1. A bevel gear drive for two wheeled vehicles of the character described, comprising in combination a pair of fixed side frame members, a transverse fixed tubular shaft supported from said members divided intermediate its length to constitute two separable parts, a ring gear mounted to rotate upon one part of said tubular shaft, a brake drum rotating with the ring gear, a driving pinion meshed with the ring gear, a longitudinally extending drive shaft upon which said pinion is mounted, a housing in which the drive shaft and pinion are enclosed, said housing including a fixed disc which closes the open side of the brake drum, brake mechanism within the drum and supported from said disc, a wheel, anti-friction bearings supporting the wheel from the other part of the tubular shaft and removable fastenings securing the wheel to rotate with the brake drum and ring gear.

2. A structure as recited in claim 1 in combination with a fixed shaft extending through the tubular shaft and through the side frame members and provided with binding means for drawing the said frame members toward each other.

3. A structure as recited in claim 1 in combination with a fixed shaft which extends through the tubular shaft and through the side frame members, said fixed shaft being materially longer than the tubular shaft, a filling nipple upon the fixed shaft filling the space between the end of the tubular shaft and the adjacent side frame member and means upon the fixed shaft, outside of the side frame members for drawing said members forcibly toward each other to bind said nipple against the end of the tubular shaft.

4. A structure of the character described comprising a pair of side frame members, a fixed shaft extending through said members, a two part tubular shaft mounted upon the fixed shaft, the combined length of the two parts being much less than the distance between the side frame members, a nipple upon the tubular shaft filling the space between the end of the tubular shaft and the adjacent side frame members, anti-friction bearings supported from the exterior of the tubular shaft, a ring gear body and ring gear supported upon said anti-friction bearings, a separate ring, means for binding the separate ring to the ring gear body, a brake drum bound between the ring and ring gear body to be forced to turn therewith, a wheel comprising a hub and anti-friction bearings through which said wheel is mounted to turn upon the exterior of that section of the tubular shaft other than the section upon which the ring gear is mounted, a pinion meshing with the ring gear, a drive shaft for the pinion, a housing for the pinion, a disc supported from said housing and through which the tubular shaft passes, said disc being shaped to close the outside of the brake drum and brake mechanism within the drum supported from said disc.

5. A structure as recited in claim 4 in combination with a grease housing, one edge of which, closely embraces the ring gear body and the other edge of which is secured to the fixed disc and a grease ring secured to said housing and bearing upon the ring gear body.

6. A bevel gear drive for two wheeled vehicles of the character described, comprising in combination a pair of fixed side frame members, a transverse fixed tubular shaft supported from said members, divided intermediate its length to constitute two separable parts, a ring gear mounted to rotate upon one part of said tubular shaft, a brake drum rotating with the ring gear, a driving pinion meshed with the ring gear, a longitudinally extending drive shaft upon which said pinion is mounted, a housing in which the drive shaft and pinion are enclosed, said housing carrying a fixed disc which closes the open side of the brake drum, brake mechanism within the drum and supported from the disc, a wheel, anti-friction bearings supporting the wheel from the other part of the tubular shaft, removable fastenings securing the wheel to rotate with the brake drum and ring gear, a grease housing secured to the inner side of the fixed disc and closely embracing the periphery of the ring gear body, and separating the space within the brake drum into separate compartments for the ring gear and the brake mechanism, and a grease ring disposed to close the joint between the grease housing and the ring gear body to prevent the entry of grease from the ring gear space to the brake mechanism.

JAMES G. TINGLE.